(12) United States Patent
Hamachi

(10) Patent No.: US 9,202,152 B2
(45) Date of Patent: Dec. 1, 2015

(54) WIRED COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/933,021

(22) Filed: Jul. 1, 2013

(65) Prior Publication Data

US 2014/0009780 A1   Jan. 9, 2014

(30) Foreign Application Priority Data

Jul. 9, 2012   (JP) .................................. 2012-153705

(51) Int. Cl.
| | | |
|---|---|---|
| *G06F 15/00* | (2006.01) | |
| *G06K 1/00* | (2006.01) | |
| *G06F 3/12* | (2006.01) | |
| *G06K 15/00* | (2006.01) | |

(52) U.S. Cl.
CPC .......... *G06K 15/4055* (2013.01); *G06F 3/1221* (2013.01); *G06F 3/1236* (2013.01); *G06F 3/1286* (2013.01); *Y02B 60/1271* (2013.01)

(58) Field of Classification Search
None
See application file for complete search history.

(56) References Cited

U.S. PATENT DOCUMENTS

| | | | | |
|---|---|---|---|---|
| 2002/0149789 | A1* | 10/2002 | Okazawa ...................... | 358/1.14 |
| 2005/0198428 | A1* | 9/2005 | Ikeda ............................ | 710/313 |
| 2005/0262367 | A1* | 11/2005 | Shih ............................... | 713/323 |
| 2006/0200704 | A1* | 9/2006 | Takahashi et al. .............. | 714/38 |
| 2007/0119937 | A1* | 5/2007 | Kikuta ......................... | 235/462.3 |
| 2010/0218011 | A1* | 8/2010 | Diab et al. ..................... | 713/310 |
| 2011/0085454 | A1* | 4/2011 | Diab et al. .................... | 370/252 |
| 2012/0072747 | A1* | 3/2012 | Yoshida ........................ | 713/320 |

FOREIGN PATENT DOCUMENTS

JP       2011-212946 A    10/2011

OTHER PUBLICATIONS

Anande Khanse, Pros and Cons of different Power Plans available in Windows 7 <http://www.thewindowsclub.com/pros-and-cons-of-the-different-power-plans-available-in-windows-7> published Sep. 22, 2010.*

* cited by examiner

*Primary Examiner* — Ming Hon
(74) *Attorney, Agent, or Firm* — Canon U.S.A., Inc., IP Division

(57) ABSTRACT

A communication apparatus having a wired interface configured to communicate with another communication apparatus via a wired communication includes a switching unit configured to switch between a first mode enabling a power-saving function in the wired interface and a second mode disabling the power-saving function, a processing unit configured to perform predetermined processing using data received via the wired interface from the other communication apparatus, and a limitation unit configured to limit the switching performed by the switching unit when the processing unit is performing the predetermined processing.

14 Claims, 9 Drawing Sheets

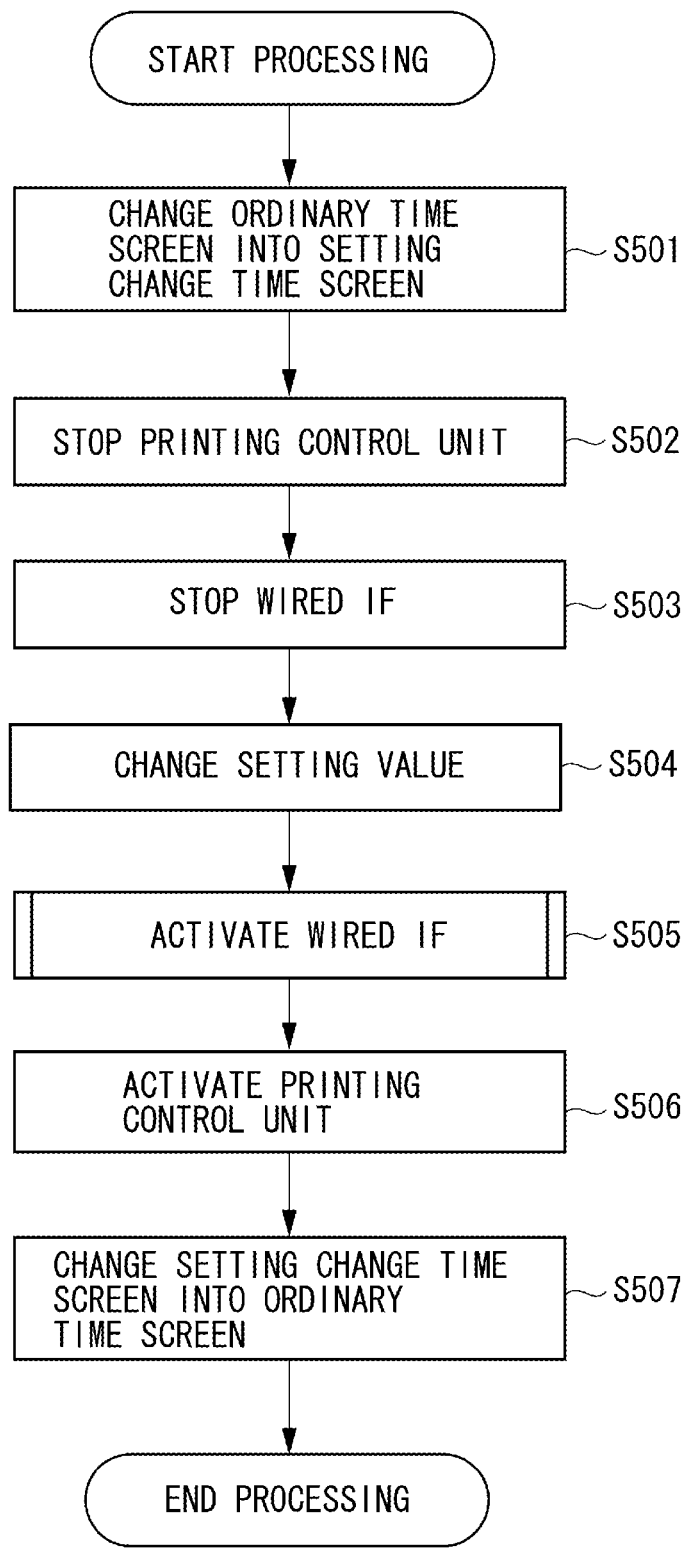

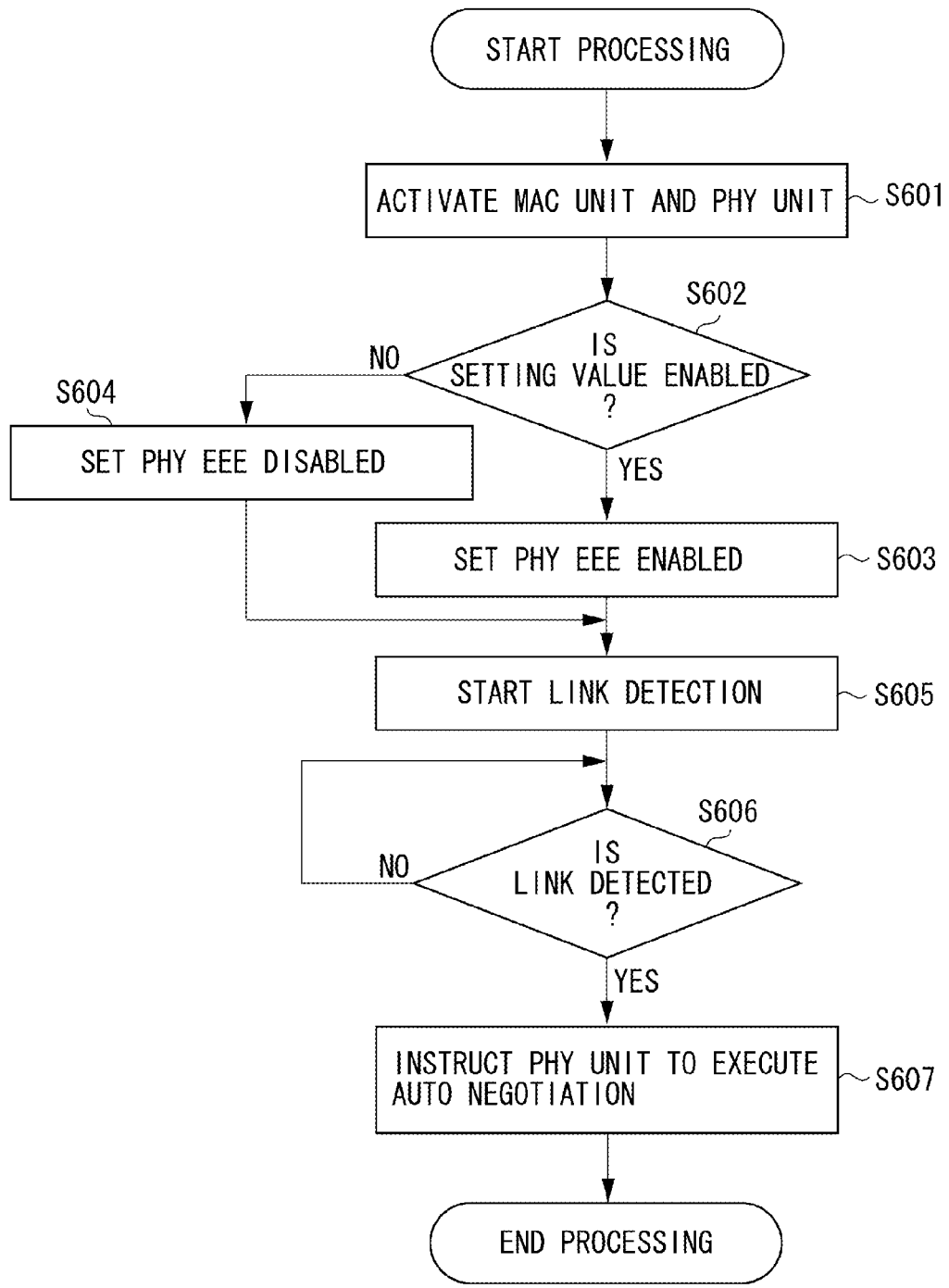

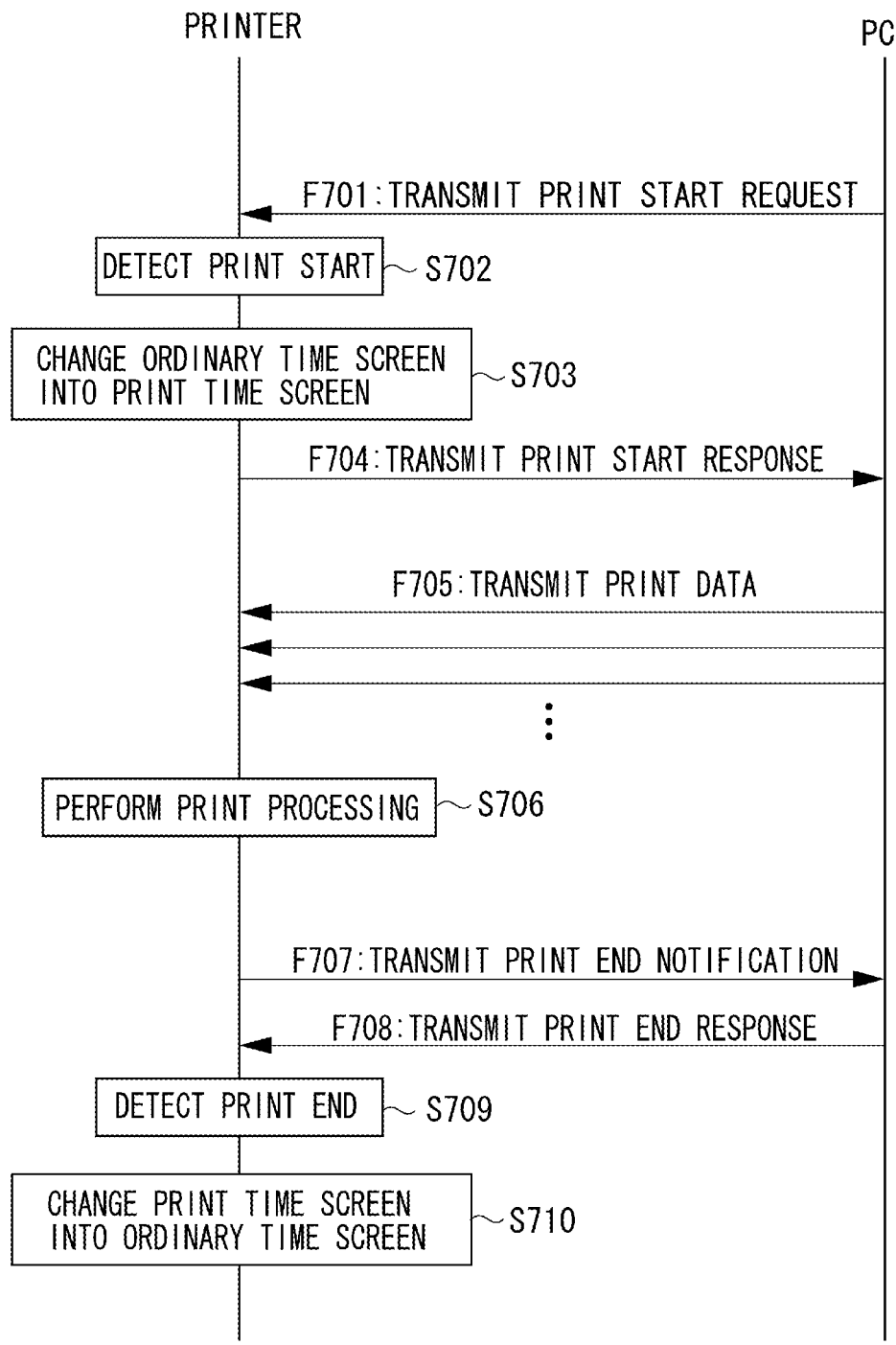

FIG. 9

| PRINT PROCESSING UNIT | WIRED IF | SETTING VALUE |
|---|---|---|
| OFF | OFF | ENABLED |

WIRED COMMUNICATION APPARATUS, METHOD FOR CONTROLLING THE SAME, AND STORAGE MEDIUM

BACKGROUND OF THE INVENTION

1. Field of the Invention

The present invention relates to a communication apparatus having a power-saving function.

2. Description of the Related Art

Energy Efficient Ethernet (EEE) exists as a power-saving function of Ethernet, which is a wired network complying with Institute of Electrical and Electronics Engineers (IEEE) 802.3. The EEE employs a Low Power Idle (LPI) technique for reducing power consumption (standby power requirement) in a time period (standby state) in which data communication is not performed in a wired interface (corresponding to a physical layer (PHY)) (Japanese Patent Application Laid-Open No. 2011-212946).

To use the EEE, it is confirmed that a communication apparatus (for example, a printer) and another communication apparatus (for example, a hub) as a communication partner support the EEE in auto negotiation performed when the communication apparatus and the other communication apparatus establish a communication link. Herein, when even one of the communication apparatus and the other communication apparatus does not support the EEE (also including a case where the EEE is disabled), the EEE cannot be used.

When a setting for the EEE is changed in the communication apparatus (more specifically, when the EEE is switched from an enabled state to a disabled state, or the EEE is switched from the disabled state to the enabled state), it is necessary to reperform the auto negotiation. Since the auto negotiation is performed when the communication link is established, the communication apparatus disconnects the communication link, and then reestablishes the communication link to perform the auto negotiation.

If the communication apparatus switches between the enabled state and the disabled state of the power-saving function (for example, the EEE) in the wired interface when the communication apparatus receives data, the communication link between the communication apparatus and the other communication apparatus is disconnected. That may bring about a failure in the reception of the data to cause loss of ability to perform predetermined processing.

SUMMARY OF THE INVENTION

The present invention is directed to a communication apparatus capable of reducing the possibility that switching between an enabled state and a disabled state of a power-saving function in a wired interface may cause a failure in reception of data and thus may cause loss of ability to perform predetermined processing.

According to an aspect of the present invention, a communication apparatus having a wired interface configured to communicate with another communication apparatus via a wired communication includes a switching unit configured to switch between a first mode enabling a power-saving function in the wired interface and a second mode disabling the power-saving function, a processing unit configured to perform predetermined processing using data received via the wired interface from the other communication apparatus, and a limitation unit configured to limit the switching performed by the switching unit when the processing unit is performing the predetermined processing.

According to an exemplary embodiment of the present invention, a communication apparatus can reduce the possibility that switching between an enabled state and a disabled state of a power-saving function in a wired interface may cause a failure in reception of data and thus may cause loss of ability to perform predetermined processing.

Further features of the present invention will become apparent from the following description of exemplary embodiments with reference to the attached drawings.

BRIEF DESCRIPTION OF THE DRAWINGS

FIG. 5 is a processing flow chart of the apparatus.
FIG. 6 is a processing flow chart of the apparatus.
FIG. 7 is a processing sequence chart between apparatuses.
FIG. 9 illustrates a table stored in a storage unit.

DESCRIPTION OF THE EMBODIMENTS

Figure 1:
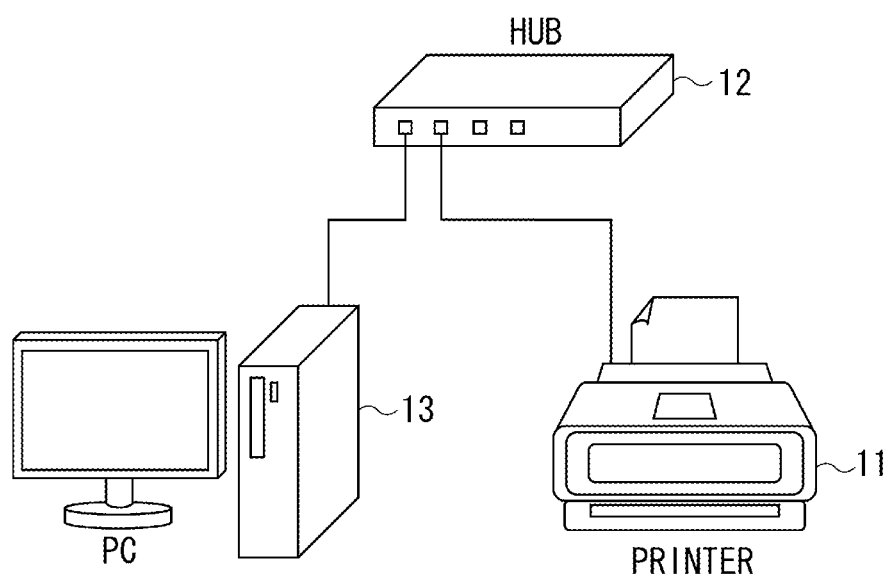
FIG. 1 is a network configuration diagram.

FIG. 1 illustrates a configuration of a wired network system including a communication apparatus (hereinafter, a printer) according to the present exemplary embodiment, another communication apparatus (hereinafter, a hub), and a personal computer (PC). Although an example using Ethernet complying with IEEE802.3 is described in the present exemplary embodiment, a communication mode is not necessarily limited to the Ethernet complying with the IEEE802.3.

A printer 11 is connected to a hub 12 by an Ethernet cable. The hub 12 is connected to the printer 11 and a PC 13 by the Ethernet cable. A router may be used instead of the hub 12.

The printer 11 and the hub 12 support EEE (Energy Efficient Ethernet), which is a power-saving function to reduce standby power consumption. In the printer 11, a user can switch whether the EEE is enabled or disabled.

The PC 13 is connected to the hub 12 by the Ethernet cable. The printer 11 and the PC 13 can communicate with each other via the hub 12.

Figure 2:
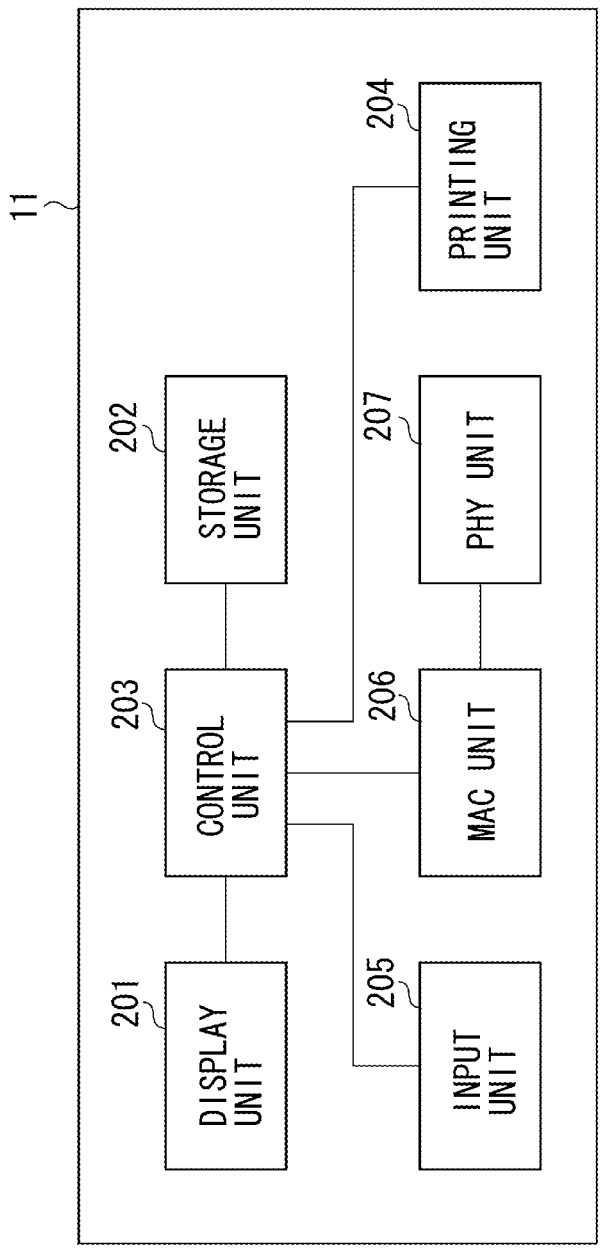
FIG. 2 is a hardware configuration diagram of a printer.

FIG. 2 illustrates a hardware configuration of the printer 11.

A display unit 201 has a function enabling output of information being visually recognizable by a user such as a liquid crystal display (LCD) or a light-emitting diode (LED) configured to perform various types of display, and/or sound output as a speaker. A storage unit 202 includes a read-only memory (ROM) and a random access memory (RAM). The storage unit 202 stores various types of information, such as a program configured to perform various operations which will be described below, and a communication parameter. Besides memories such as a ROM and a RAM, storage media such as a flexible disk, a hard disk, an optical disk, a magneto optical disk, a compact disc (CD)-ROM, a CD-compact disc (R), a magnetic tape, a nonvolatile memory card, and a digital versatile disk (DVD) may be used as the storage unit 202. A control unit 203 includes a CPU or a micro processing unit (MPU). The control unit 203 executes the program stored in the storage unit 202 to control the entire printer 11.

A printing unit 204 processes and prints print data received from the PC 13 via a PHY unit 207 and a media access control (MAC) unit 206 which will be described below. An input unit 205 includes a button. The input unit 205 accepts instruction of the operation of the printer 11 (print processing instruction) by the user and change instruction of various settings by the user. For example, the input unit 205 receives a user instruction configured to switch from a first mode enabling the EEE to a second mode disabling the EEE, or to switch from the second mode to the first mode. The MAC unit 206 processes a data link layer of the Ethernet. The PHY unit 207 processes a physical layer of the Ethernet. The PHY unit 207 sets a predetermined value to a register to perform setting for the EEE. Hereinafter, the MAC unit 206 and the PHY unit 207 may be referred to as a wired interface (IF).

Figure 3:
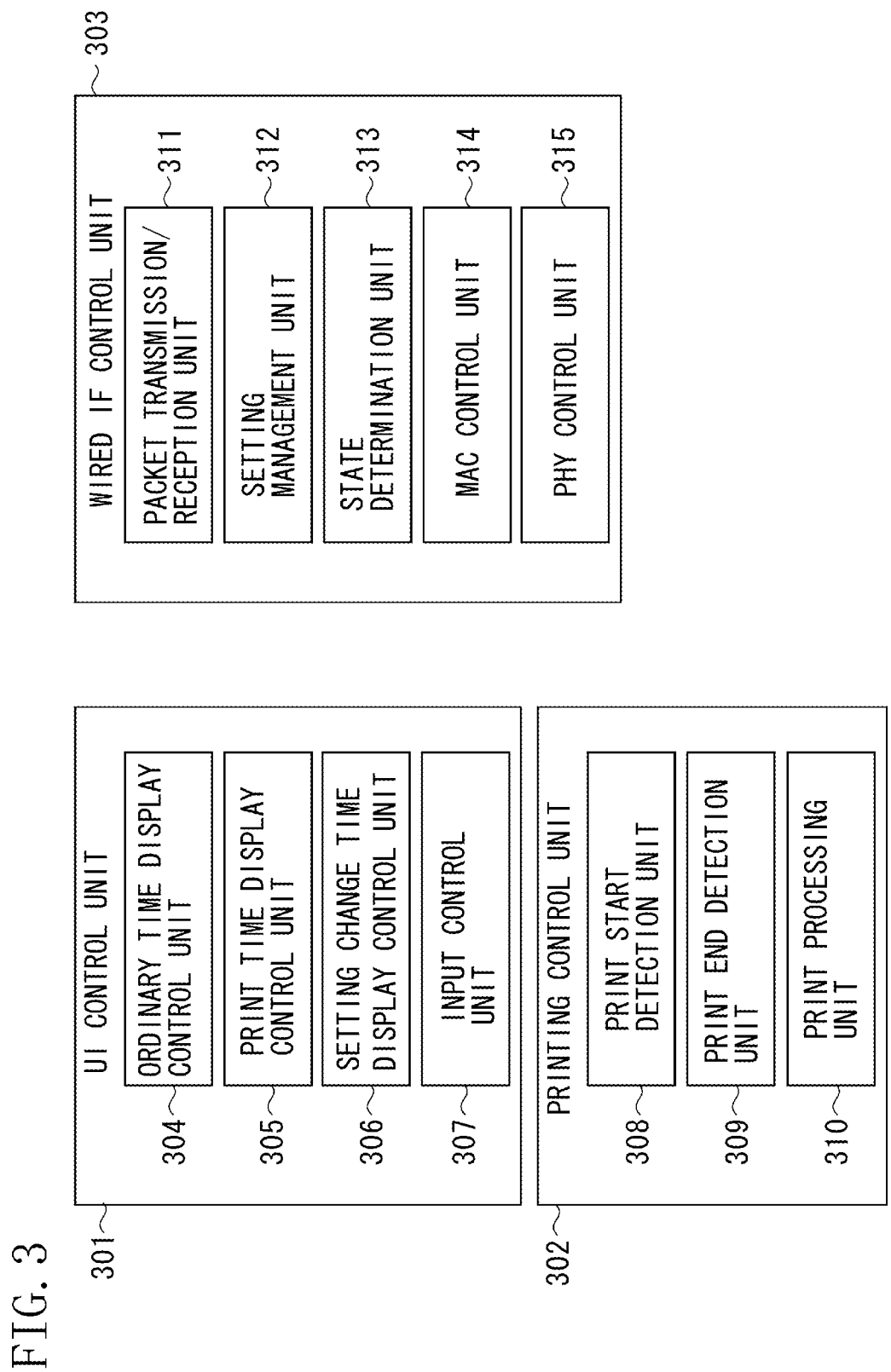
FIG. 3 is a software function block diagram of the printer.

FIG. 3 illustrates a software function block realized when the control unit 203 of the printer 11 reads the program stored in the storage unit 202. Hardware may realize at least a part of the software function block illustrated in FIG. 3. A user interface (UI) control unit 301 includes function blocks 304 to 307 which will be described below, and controls the display unit 201 and the input unit 205. A printing control unit 302 includes function blocks 308 to 310 which will be described below, and controls a printing function. A wired IF control unit 303 includes function blocks 311 to 314 which will be described below, and controls communication using the Ethernet including the MAC unit 206 and the PHY unit 207. An ordinary time UI display unit 304 performs processing to output an ordinary time display screen to the display unit 201. A print time UI display unit 305 performs processing to output a print time display screen to the display unit 201. A setting change time UI display unit 306 performs processing to output a setting change time display screen to the display unit 201. An input control unit 307 detects a user input (for example, the press, touch, and slide of the button) using the input unit 205. The input control unit 307 can disable a part of input functions depending on the display screen being output to the display unit 201.

A print start detection unit 308 detects the start of printing in the printing unit 204. Specifically, the print start detection unit 308 receives the print data from the PC 13 via the PHY unit 207 and the MAC unit 206 to detect the start of the printing. However, without being limited thereto, the print start detection unit 308 may receive a message notifying the start of the printing from the PC 13 via the PHY unit 207 and the MAC unit 206 to detect the start of the printing. The print start detection unit 308 may detect the start of the printing when the input unit 205 accepts a start instruction of the printing by the user.

A print end detection unit 309 detects end of print processing. The print end detection unit 309 detects the end of the print processing according to reception of a print end notification from a print processing unit 310. However, without being limited thereto, the print end detection unit 309 may detect the end of the print processing according to reception of a message notifying the end of the print processing from the PC 13.

The print processing unit 310 performs the print processing on the print data received from the PC 13 via the PHY unit 207 and the MAC unit 206 using the printing unit 204. A packet transmission/reception unit 311 controls packet transmission/reception processing with an external apparatus. The packet transmission/reception unit 311 receives print data transmitted from the external apparatus, and passes the received print data to the print processing unit 310. A setting management unit 312 stores a setting value (a value indicating whether the EEE is enabled or disabled) for the Ethernet in the storage unit 202, and reads the setting value from the storage unit 202. The setting value is stored in the storage unit 202. The setting management unit 312 updates and acquires the setting value. A state determination unit 313 determines a state of a wired IF. A MAC control unit 314 controls the MAC unit 206 of the Ethernet. A PHY control unit 315 controls the PHY unit 207 of the Ethernet. The setting of the PHY unit 207 can be changed by changing the register of the PHY unit 207. For example, a predetermined value is set to the register mapped on the EEE, and whereby the PHY unit 207 can be controlled so that the PHY unit 207 operates in a state where the EEE is enabled.

Figure 4:
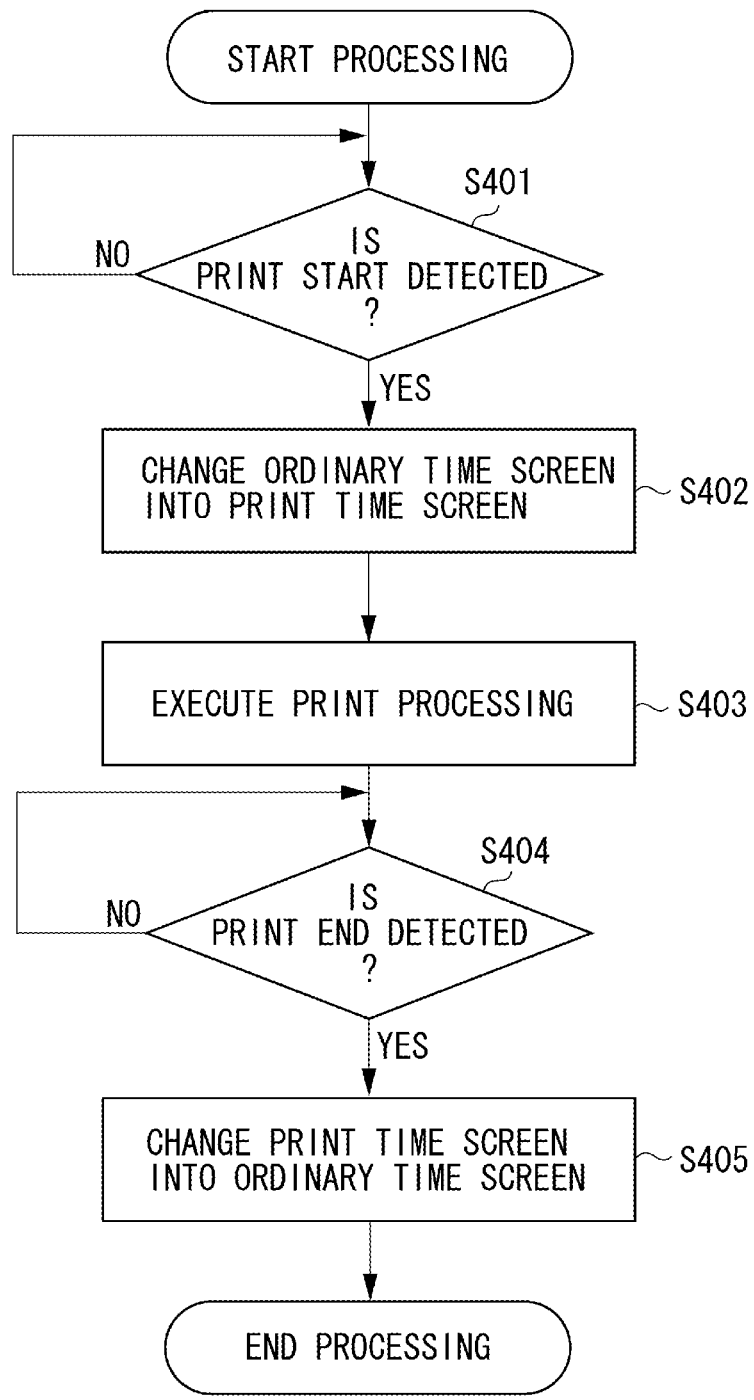
FIG. 4 is a processing flow chart of an apparatus.

FIG. 4 illustrates a flow chart realized when the printer 11 performs the print processing and the control unit 203 of the printer 11 reads the program stored in the storage unit 202.

FIG. 7 is a sequence chart when the printing is instructed from the PC 13 to the printer 11 in a state where the printer 11 and the PC 13 are connected via the hub 12. Although the hub 12 is omitted from FIG. 7, the respective printer 11 and the PC 13 are connected to the hub 12 by the Ether cable. Entire communication between the printer 11 and the PC 13 which will be described below is performed via the hub 12.

First, in step F701, when the user instructs the printing in the PC 13, the PC 13 transmits a print start request to the printer 11. In step S401 and step F702, the print start detection unit 308 determines whether the printing is started according to reception of the print start request from the PC 13 via the wired IF. When the print start detection unit 308 detects the start of the printing (YES in step S401, and in step F702), then in step S402 and step F703, the print time display unit 305 changes a screen displayed on the display unit 201 from an ordinary time screen into a print time screen. The print time screen is a screen indicating that printing is in progress as illustrated in FIG. 8B. The print time screen does not display an item 801 that allows the user to perform setting change unlike the ordinary time screen illustrated in FIG. 8A. The input control unit 307 limits the function of the input unit 205 in a period in which the print time screen is displayed, and performs control not to accept an input except for explicitly canceling the printing. That is, the input control unit 307 controls both the display unit 201 and the input unit 205 so that the user cannot operate the setting change.

In step F704, the wired IF responds to the reception of the print start request from the PC 13, and transmits a print start response to the PC 13. In step F705, when the PC 13 receives the print start response from the printer 11, the PC 13 starts the transmission of the print data.

In step S403 and step F706, the print processing unit 310 performs the print processing based on the acquired print data. Then, in step S404, the print end detection unit 309 determines whether the print processing ends. When the end of the printing is detected (YES in step S404), then in step F707, a communication IF transmits a print end notification to the PC 13. In step F708, when the PC 13 receives the print end notification, the PC 13 transmits a print end response to the printer 11.

In step S405, when the communication IF receives the print end response, the ordinary time display control unit 304 changes the screen displayed on the display unit 201 from the print time screen into the ordinary time screen. This brings about a state where the user can execute operations such as the setting change.

FIG. 5 illustrates a flow chart realized when the printer 11 changes the setting of the EEE and the control unit 203 of the printer 11 reads the program stored in the storage unit 202. In an initial condition, the printing control unit 302 does not perform the print processing but awaits the print start request from the PC 13.

Figure 8A:
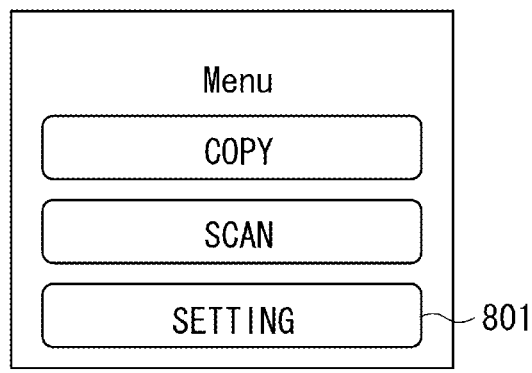
FIGS. 8A-C illustrate a display screen in the printer.
Figure 8B:
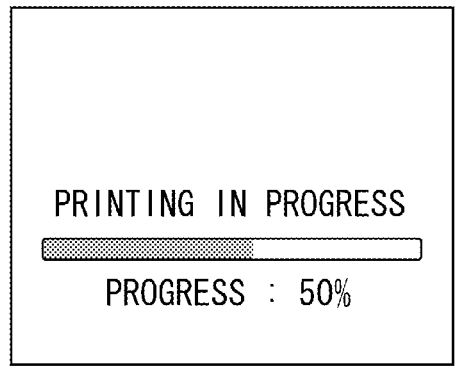
Figure 8C:
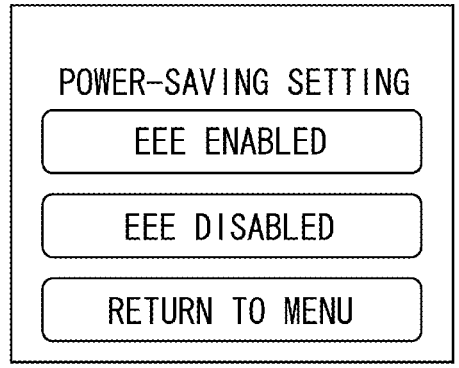

In step S501, when the user instruction to the input unit 205 starts setting change processing of the EEE (more specifically, when the input unit 205 detects the press of a button 801 in FIG. 8A), the setting change time display control unit 306 changes the screen displayed on the display unit 201 from the ordinary time screen into a setting change time screen. Herein, the ordinary time screen is a screen illustrated in FIG. 8A. The setting change time screen is a screen illustrated in FIG. 8C. The setting change processing is executed when the display unit 201 displays the ordinary time screen (more specifically, when the print processing is not performed). Meanwhile, because the function is limited in the case of the print time screen, the setting change processing is not executed.

In step S502, when the user instructs the setting change, the printing control unit 302 stops its own operation. This brings about a state where the printer 11 does not accept the instructions of the print data and printing. In this case, the print processing unit 310 writes information indicating that the printing control unit 302 is in an operation stop state (OFF) in the storage unit 202. The written information is stored as a table illustrated in FIG. 9 in the storage unit 202.

In step S503, when the operation stop of the printing control unit 302 is completed, the wired IF control unit 303 stops the wired IF. This brings about a state where the MAC unit 206 and the PHY unit 207 do not operate. In this case, the wired IF control unit 303 writes information indicating that the wired IF is in an operation stop state (OFF) in the storage unit 202. The written information is stored as the table illustrated in FIG. 9 in the storage unit 202.

In step S504, when the wired IF stops, the setting management unit 312 writes a setting value (a value indicating whether the EEE is enabled or disabled) instructed by the user in the storage unit 202. The written information is stored as the table illustrated in FIG. 9 in the storage unit 202. Herein, the setting value is merely stored in the storage unit 202, and is not set to the PHY unit 207. When the state determination unit 313 determines that the change of the setting value is instructed in a state where the wired IF is activated, the case is determined to be an error. In the case of the error, the specified setting value is not stored in the storage unit 202, and the user is notified of the error. Herein, the case where the change of the setting value is instructed in the state where the wired IF is activated is a case where abnormality occurs in the wired IF and stop processing is not normally ended in step S503, for example. Since the user is notified of the error in the case, the user can recognize the error, and perform coping such as reactivation, for example.

Next, in step S505, the wired IF control unit 303 performs activation processing of the wired IF. In the IF activation processing, processing is switched according to the setting value stored in the storage unit 202. The details of the IF activation processing will be described below.

In step S506, when the activation of the IF is ended, the printing control unit 302 is activated. In step S507, when the activation of the printing control unit 302 is ended, the ordinary time display control unit 304 changes the screen displayed on the display unit 201 from the setting change time screen into the ordinary time screen. Therefore, the limitation of a user operation is released to bring about a state where the print data can be accepted. The printing control unit 302 is activated, and whereby the awaiting of the print start request from the PC 13 is restarted.

FIG. 6 illustrates a flow chart realized when the printer 11 activates the wired IF and the control unit 203 of the printer 11 reads the program stored in the storage unit 202.

First, in step S601, the wired IF control unit 303 activates the MAC unit 206 and the PHY unit 207. In step S602, the setting management unit 312 determines whether the setting value stored in the storage unit 202 is enabled or disabled.

When the setting management unit 312 determines that the setting value is enabled (YES in step S602), then in step S603, the setting management unit 312 sets the PHY unit 207 EEE enabled. Then, in step S605 and S606, the PHY unit 207 starts link detection. In the link detection, the PHY unit 207 detects connection of one end of the Ether cable to the PHY unit 207 and connection of the other end of the cable to the hub 12.

Meanwhile, when the setting management unit 312 determines that the setting value is disabled (NO in step S602), then in step S604, the setting management unit 312 sets the PHY unit 207 EEE disabled. Then, in step S605 and step S606, the PHY unit 207 performs the link detection.

When the link is detected (YES in step S606), then in step S607, the wired IF control unit 303 instructs execution of auto negotiation to the PHY unit 207. When the PHY unit 207 is set EEE enabled, the PHY unit 207 outputs a signal indicating the EEE enabled in the auto negotiation. Meanwhile, when the PHY unit 207 is set EEE disabled, the PHY unit 207 outputs a signal indicating EEE disabled in the auto negotiation.

The PHY unit 207 receives the signal indicating the EEE enabled from the hub 12. Therefore, when the PHY unit 207 is set EEE enabled, the wired IF control unit 303 operates an EEE function because both the printer 11 and the hub 12 are EEE enabled. Meanwhile, when the PHY unit 207 is set EEE disabled, the wired IF control unit 303 does not operate the EEE function.

Thus, because the change of communication setting by the user during transmission/reception of important data such as the print data is limited, it is possible to prevent the discontinuation of the processing caused by an unintended disconnect of the Ethernet.

Although the example of detecting the print start based on the reception of the print start request is presented in the above-described exemplary embodiment, the print start may be detected based on the start of the print processing. Although the print end is detected based on the reception of the print end response, the print end may be detected based on the end of the print processing.

Although the example of detecting the start and end of the print processing to limit the UI is described in the present exemplary embodiment, the present exemplary embodiment may also employ another processing. For example, the instruction of the communication setting change by the UI may be accepted during the print processing, and the instruction may be reflected after the print processing is ended. Thus, because the change of the communication setting by the user during the transmission/reception of the important data such as the print data is limited, it is possible to prevent the discontinuation of the processing caused by the unintended disconnect of the Ethernet.

The print start may be determined by detecting the reception start of the print data, and the print end may be determined by detecting the end of reception of the print data. Thus, because the change of the communication setting by the user during the transmission/reception of the important data such as the print data is limited, it is possible to prevent the discontinuation of the processing caused by the unintended disconnect of the Ethernet.

The present exemplary embodiment may be applied not only to the user operation via the input unit 205 of the printer 11, but also to a user interface operating and setting the printer 11 using a web browser or a dedicated application from the PC 13.

The present exemplary embodiment displays the screen indicating that the print processing is in progress during the print processing, and does not display a setting button (a button to switch between the EEE enabled and disabled), thereby limiting switching between the EEE enabled and disabled. However, without being limited thereto, even when the setting button is displayed to be grayed out and the setting button is pressed by the user (including a case where the setting button is selected), the operation may not be accepted. When the user presses the button (including a case where the button is selected) to set the EEE enabled or EEE disabled after transition to the setting screen (FIG. 8C), the operation may not be accepted. Thus, the above-described effect may be attained.

The printer 11 may further include a not illustrated wireless communication unit. In this case, even when a wired communication unit (wired IF) disconnects a communication link (stop the wired IF), the communication link of the wireless communication unit is continued without being disconnected. Thus, the wireless communication can be continued regardless of the state of the wired IF.

The exemplary embodiment of the present invention has one or a plurality of the above-described effects.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153705 filed Jul. 9, 2012, which is hereby incorporated by reference herein in its entirety.

What is claimed is:

1. A communication apparatus comprising:
    a wired interface configured to communicate with another communication apparatus via a wired communication;
    a display control unit configured to cause a display unit to display a first screen image for a user to switch between a first mode enabling a power-saving function in the wired interface and a second mode disabling the power-saving function;
    an input unit configured to allow the user to input an instruction for switching between the first mode and the second mode while the first screen image is displayed by the display unit;
    a processing unit configured to perform predetermined processing using data received via the wired interface from said another communication apparatus; and
    a control unit configured to:
        (1) restrict the user from inputting the instruction for switching between the first mode and the second mode via the input unit while the processing unit is performing the predetermined processing, by not displaying the first screen image but displaying a second screen image different from the first screen image, and
        (2) allow the user to input the instruction for switching between the first mode and the second mode via the input unit if the processing unit is not performing the predetermined processing, by displaying the first screen image without displaying the second screen image.

2. The communication apparatus according to claim 1, wherein the wired interface includes an interface configured to connect the communication apparatus to Ethernet.

3. The communication apparatus according to claim 1, further comprising a detection unit configured to detect start and end of the predetermined processing performed by the processing unit,
    wherein a duration when the processing unit is performing the predetermined processing refers to a period from detection of the start of the predetermined processing by the detection unit to detection of the end of the predetermined processing.

4. The communication apparatus according to claim 1, wherein, in response to the user inputting the instruction for switching between the first mode and the second mode via the input unit, the communication apparatus disconnects a communication link between the communication apparatus and said another communication apparatus using the wired interface.

5. The communication apparatus according to claim 1, further comprising an activation unit configured to activate the wired interface,
    wherein, in a case where a user switches to the first mode using the inputting unit, the activation unit activates the wired interface in a state where the power-saving function in the wired interface is enabled, and
    wherein, in a case where the user switches to the second mode using the switching unit, the activation unit activates the wired interface in a state where the power saving function in the wired interface is disabled.

6. The communication apparatus according to claim 1, wherein the power-saving function reduces power consumption of the wired interface in a case where the wired interface is in a standby state.

7. The communication apparatus according to claim 1, wherein the power-saving function includes an Energy Efficient Ethernet function.

8. The communication apparatus according to claim 1,
    wherein the processing unit performs print processing by receiving print data via the wired interface from said another communication apparatus, and
    wherein the control unit restricts the user from inputting the instruction for switching between the first mode and the second mode via the input unit while printing.

9. A non-transitory computer-readable storage medium storing a program that causes a computer to operate as the communication apparatus according to claim 1.

10. The communication apparatus according to claim 1, wherein the communication apparatus is a printer.

11. A communication apparatus comprising:
    a wired interface configured to communicate with another communication apparatus via a wired communication;
    a display control unit configured to cause a display unit to display a first screen image for a user to switch between a first mode enabling a power-saving function in the wired interface and a second mode disabling the power-saving function;

an input unit configured to allow a user to input an instruction for switching between the first mode and the second mode while the first screen image is displayed by the display unit; and a processing unit configured to perform predetermined processing using data received via the wired interface from said another communication apparatus, wherein the communication apparatus is configured to:
(1) not display the first screen image but to display a second screen image different from the first screen image if the processing unit is not performing the predetermined processing, and
(2) allow the user to input the instruction for switching between the first mode and the second mode via the input unit if the processing unit is not performing the predetermined processing, by displaying the first screen image without displaying the second screen image.

12. A non-transitory computer-readable storage medium storing a program that causes a computer to operate as the communication apparatus according to claim 11.

13. A method for controlling a communication apparatus comprising:

communicating with another communication apparatus via a wired communication;

causing a display unit to display a first screen image for a user to switch between a first mode enabling a power-saving function in the wired interface and a second mode disabling the power-saving function;

allowing the user to input an instruction for switching between the first mode and the second mode while the first screen image is displayed by the display unit;

performing predetermined processing using data received via the wired interface from said another communication apparatus; and controlling the communication apparatus by (1) restricting a user from inputting an instruction for switching between a first mode enabling a power-saving function in the wired interface and a second mode disabling the power-saving function while predetermined processing, by not displaying the first screen image but displaying a second screen image different from the first screen image, and (2) allowing the user to input the instruction for switching between the first mode and the second mode via the input unit if the processing unit is not performing the predetermined processing, by displaying the first screen image without displaying the second screen image.

14. A method for controlling a communication apparatus comprising:

communicating with another communication apparatus via a wired communication;

causing a display unit to display a first screen image for a user to switch between a first mode enabling a power-saving function in the wired interface and a second mode disabling the power-saving function;

allowing a user to input an instruction for switching between the first mode and the second mode while the first screen image is displayed by the display unit; and performing predetermined processing using data received via the wired interface from said another communication apparatus, wherein the communication apparatus is configured to:
(1) not display the first screen image but to display a second screen image different from the first screen image if the processing unit is not performing the predetermined processing, and
(2) allow the user to input the instruction for switching between the first mode and the second mode if the predetermined processing is not being performed, by displaying the first screen image without displaying the second screen image.

\* \* \* \* \*